US012358116B2

(12) United States Patent
Kamijo et al.

(10) Patent No.: US 12,358,116 B2
(45) Date of Patent: Jul. 15, 2025

(54) ELECTRIC TOOL

(71) Applicant: MAXELL IZUMI CO., LTD., Matsumoto (JP)

(72) Inventors: Keiichiro Kamijo, Matsumoto (JP); Katsutoshi Kochiyama, Matsumoto (JP)

(73) Assignee: MAXELL IZUMI CO., LTD., Matsumoto (JP)

( * ) Notice: Subject to any disclaimer, the term of this patent is extended or adjusted under 35 U.S.C. 154(b) by 0 days.

(21) Appl. No.: 18/270,927

(22) PCT Filed: May 18, 2022

(86) PCT No.: PCT/JP2022/020639

§ 371 (c)(1),
(2) Date: Jul. 5, 2023

(87) PCT Pub. No.: WO2022/249945

PCT Pub. Date: Dec. 1, 2022

(65) Prior Publication Data

US 2024/0051108 A1 Feb. 15, 2024

(30) Foreign Application Priority Data

May 26, 2021 (JP) ................................. 2021-088074

(51) Int. Cl.
*B25F 5/00* (2006.01)
*F04B 1/143* (2020.01)
*F04B 1/182* (2020.01)

(52) U.S. Cl.
CPC .............. *B25F 5/005* (2013.01); *F04B 1/143* (2013.01); *F04B 1/182* (2013.01)

(58) Field of Classification Search
CPC .......... B25F 5/005; F04B 1/143; F04B 1/182; B23D 29/002
See application file for complete search history.

(56) References Cited

U.S. PATENT DOCUMENTS 6,178,870 B1 * 1/2001 Takahashi ............. F15B 15/262 92/28
7,533,556 B2 * 5/2009 Lefavour ................ B25F 5/005 60/477

(Continued)

FOREIGN PATENT DOCUMENTS

CN 208051839 U 11/2018
JP 2018-086696 A 6/2018

(Continued)

OTHER PUBLICATIONS

PCT/ISA/210, "International Search Report for PCT International Application No. PCT/JP2022/020639," Jul. 26, 2022.

*Primary Examiner* — Andrew M Tecco
*Assistant Examiner* — Nicholas E Igbokwe
(74) *Attorney, Agent, or Firm* — HAUPTMAN HAM, LLP

(57) ABSTRACT

An electric tool is configured that oil pressure can be rapidly increased while suppressing the load on a motor. The electric tool includes a main body in which a cylinder part, a hydraulic pump for feeding hydraulic oil to the cylinder part and an electric motor are disposed, and a tool head operated by a pressing force of a piston in the cylinder part. The hydraulic pump has a swash plate cam, a first plunger, a second plunger, a check valve and a relief valve, and until the pressure reaches the first pressure, a first liquid feeding amount of the first plunger is increased than a second liquid feeding amount of the second plunger.

4 Claims, 5 Drawing Sheets

(56) References Cited

U.S. PATENT DOCUMENTS

| | | | | |
|---|---|---|---|---|
| 2007/0214861 | A1* | 9/2007 | Lefavour | F16K 17/34 72/453.16 |
| 2008/0087144 | A1* | 4/2008 | Rollins | B25F 5/005 74/559 |
| 2013/0264085 | A1* | 10/2013 | Ciotti | B25F 5/005 173/29 |
| 2017/0302044 | A1* | 10/2017 | Lefavour | B25F 5/02 |
| 2020/0254600 | A1* | 8/2020 | Kamijo | H01R 43/0427 |

FOREIGN PATENT DOCUMENTS

| | | | |
|---|---|---|---|
| KR | 20-0378195 | Y1 | 3/2005 |
| WO | 2019/111390 | A1 | 6/2019 |

* cited by examiner

[N1=N2] [D1>D2] [S1>S2]

[N1=3、N2=1] [D1=D2]

ELECTRIC TOOL

RELATED APPLICATIONS

The present application is National Phase of International Application No. PCT/JP2022/020639 filed May 18, 2022, and claims priority from Japanese Application No. 2021-088074, filed May 26, 2021, the disclosures of which are hereby incorporated by reference herein in its entirety.

TECHNICAL FIELD

The present invention relates to a hydraulic electric tool.

BACKGROUND ART

In the related art, a hydraulic electric tool is known (PTL 1: JP-A-2018-086696).

CITATION LIST

Patent Literature

PTL 1: JP-A-2018-086696

SUMMARY OF INVENTION

Technical Problem

An electric tool in the related art tends to consume a lot of battery power, when operations of a tool head such as pressing and crimping are repeated in a short period of time. A maximum current value that can be electrically supplied to an electric motor is determined in advance depending on rating of a battery. Therefore, in order to reduce battery consumption and perform a long-term operation, a market demand is to efficiently operate the electric motor while a load on the electric motor is reduced. In addition, in order to repeat the operation of the tool head in a short period of time, a market demand is to shorten an operation time by quickly increasing a hydraulic pressure from a low pressure to a high pressure.

Solution to Problem

The present invention is made in view of the above described circumstances, and aims to provide an electric tool which can be efficiently operated while a load on an electric motor is reduced, can reduce battery consumption compared to an electric tool in the related art, and can shorten an operation time by quickly increasing a hydraulic pressure from a low pressure to a high pressure.

The present invention has been accomplished under the solutions as disclosed below.

According to the present invention, there is provided an electric tool including a main body in which a cylinder part, an oil tank, a hydraulic pump for feeding hydraulic oil inside the oil tank to the cylinder part, and an electric motor for driving the hydraulic pump are disposed, a tool head operated by a pressing force of a piston in the cylinder part in a state of being coupled to the main body, and a battery that supplies electric power to the electric motor. The hydraulic pump has a swash plate cam rotated while being coupled to a drive shaft of the electric motor, and a plurality of plungers disposed around an axis passing through the drive shaft in the cylinder part and reciprocating while being in contact with the swash plate cam. A first plunger of the plungers is provided with a check valve that opens at a first pressure on a secondary side. A second plunger of the plungers is not provided with the check valve on the secondary side. A relief valve that opens at a second pressure higher than the first pressure is disposed in the cylinder part. Until the pressure reaches the first pressure, a first liquid feeding amount of the first plunger is increased than a second liquid feeding amount of the second plunger.

According to this configuration, a time for transition to a high-pressure stage can be shortened by increasing the liquid feeding amounts of the first plunger and the second plunger in a low-pressure stage. A maximum current value of the battery can be reduced by reducing a load on the electric motor in the high-pressure stage. Therefore, an operation time can be shortened by quickly increasing a hydraulic pressure from a low pressure to a high pressure.

As an example, a product of a plunger stroke L1, a plunger cross-section area S1, and the number of plungers N1 in the first plunger is larger than a product of a plunger stroke L2, a plunger cross-section area S2, and the number of plungers N2 in the second plunger. According to this configuration, the operation time can be shortened by quickly increasing the hydraulic pressure from the low pressure to the high pressure while achieving a reduced size suitable for the electric tool.

As an example, a battery pack including a battery such as a lithium-ion battery and a nickel-metal hydride battery is joined to an adapter of the main body, and the adapter is coupled to a handle of the main body. According to this configuration, the electric tool can be excellent in portability.

Advantageous Effects of Invention

According to the present invention, the electric tool can be efficiently operated while the load on the electric motor is reduced, battery consumption can be reduced, compared to the electric tool in the related art, and the operation time can be shortened by quickly increasing the hydraulic pressure from the low pressure to the high pressure.

BRIEF DESCRIPTION OF DRAWINGS

FIG. 2A is viewed in a C-direction.

DESCRIPTION OF EMBODIMENTS

Figure 1:
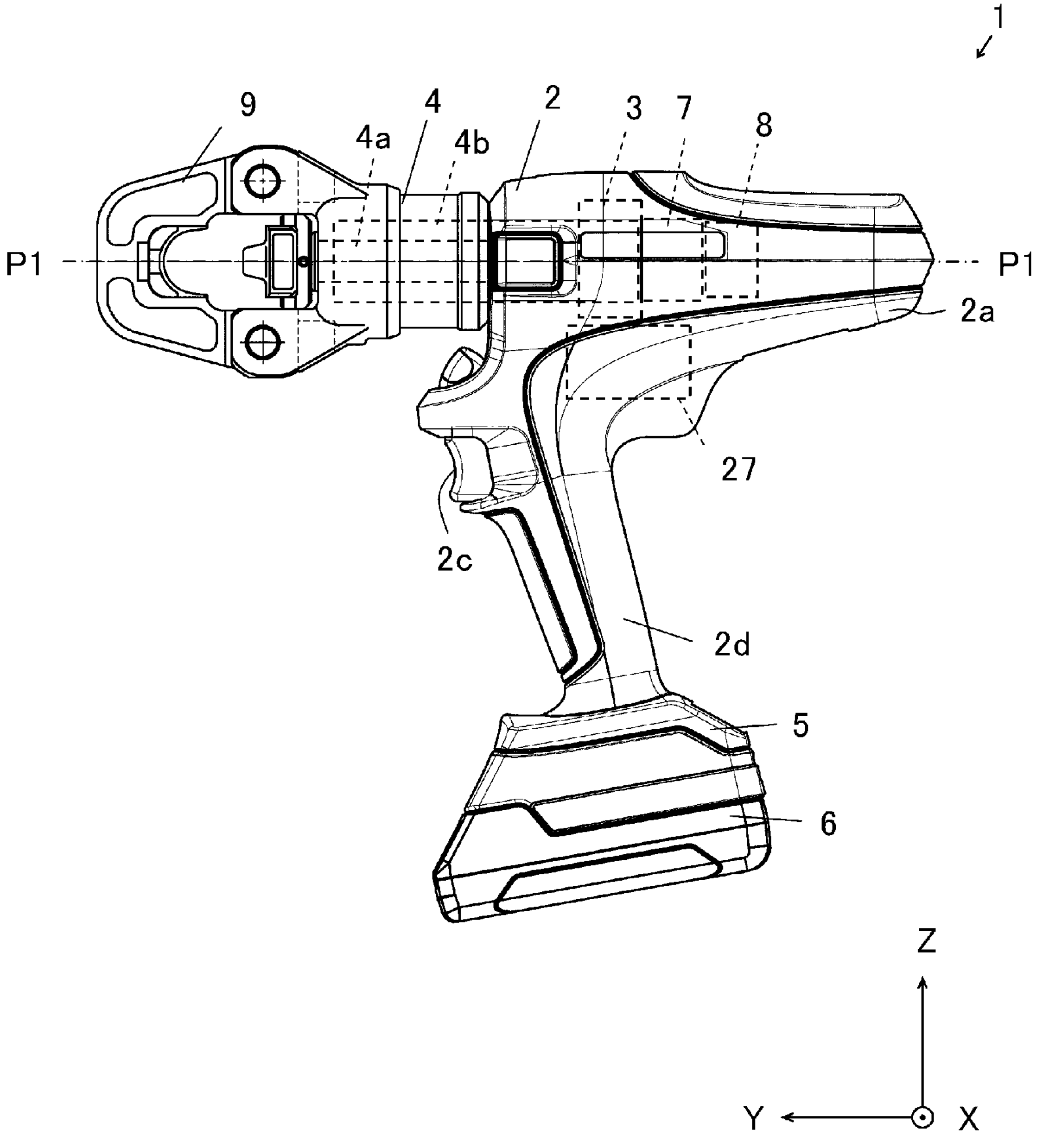
FIG. 1 is a schematic side view illustrating an example of an electric tool according to an embodiment of the present invention.

Hereinafter, an embodiment according to the present invention will be described in detail with reference to the drawings. The present embodiment provides an electric tool 1 such as an electric pressing tool, an electric crimping tool, and an electric cutting tool. In all drawings for describing the embodiment, the same reference numerals will be assigned to members having the same function, and repeated description thereof may be omitted in some cases.

FIG. 1 is a schematic view illustrating an example of the electric tool 1 according to the present embodiment. The electric tool 1 is a cordless-type tool including a main body 2, a tool head 9 operated by a pressing force of a piston 4*a* in a cylinder part 4 of the main body 2 in a state of being coupled to the main body 2, and a battery 6 for supplying electric power to an electric motor 8 of the main body 2. The electric tool 1 is held and used by a hand of an operator at a jobsite. The piston 4*a* reciprocates along an axis P1 of a drive shaft 8*a* of the electric motor 8. That is, the piston 4*a* moves forward to a side of an arrow in a Y-direction in the drawing, and moves rearward to a side opposite to the arrow in the Y-direction in the drawing. An example in FIG. 1 represents the tool head 9 of the electric pressing tool, and represents the multifunctional electric tool 1 in which the tool head 9 is replaced. Here, in order to facilitate description of a positional relationship of each part of the electric tool 1, directions are indicated by arrows X, Y, and Z in the drawing. The electric tool 1 is normally operated in any direction.

The main body 2 has the cylinder part 4, a hydraulic pump 7 coupled to the cylinder part 4 to have an integral structure, and an oil tank 3 attached to the outside of the hydraulic pump 7 and coupled to the cylinder part 4. In the cylinder part 4, the piston 4*a* is disposed in a piston chamber 4*b*, and a coil spring 4*c* is disposed along an outer periphery of the piston 4*a* in alignment with an axis of the piston 4*a*. The hydraulic pump 7 feeds hydraulic oil 3*a* stored in the oil tank 3 to the piston chamber 4*b* of the cylinder part 4. In addition, the main body 2 has an electric motor 8 coupled to the hydraulic pump 7 to drive the hydraulic pump 7, and a control circuit 27 that performs driving control on the electric motor 8. The battery 6 that supplies electric power to the electric motor 8 and the control circuit 27 is joined to an adapter 5 of the main body 2. The adapter 5 is coupled to a handle 2*d* of the main body 2. The handle 2*d* is a gripping portion gripped by the operator, and is provided with a start switch 2*c*. As an example, a battery pack including the battery 6 such as a lithium-ion battery and a nickel-metal hydride battery is joined to the adapter 5 of the main body 2, and the adapter 5 is coupled to the handle 2*d* of the main body 2. According to this configuration, the electric tool 1 is excellent in portability.

Figure 2A:
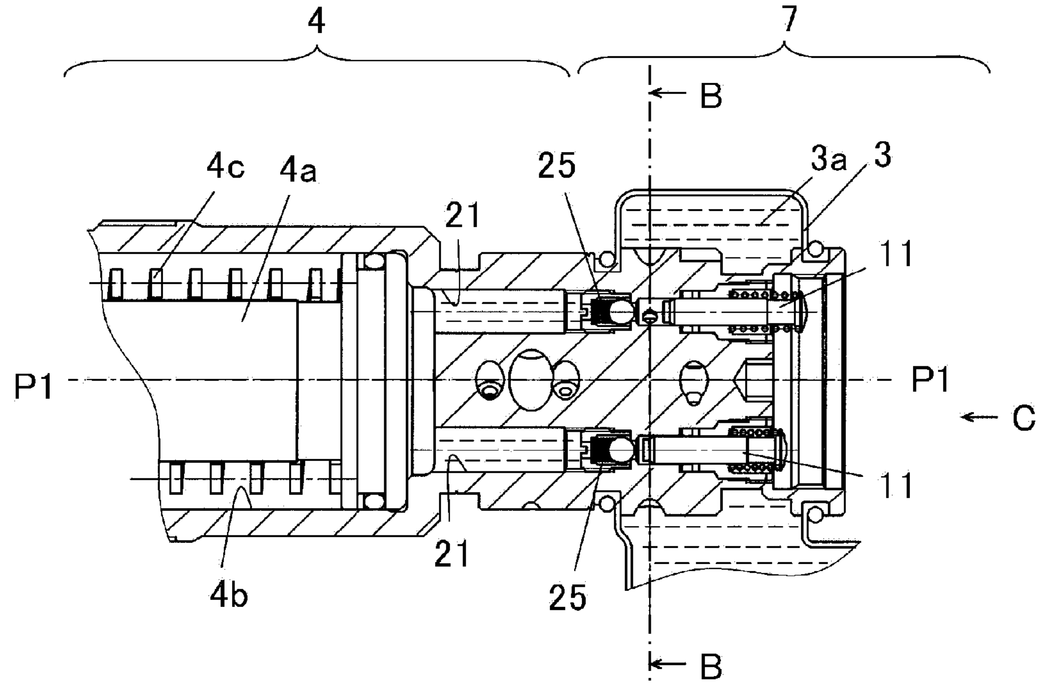
FIG. 2A is a schematic sectional view illustrating a first example of the electric tool illustrated in FIG. 1.
Figure 2B:
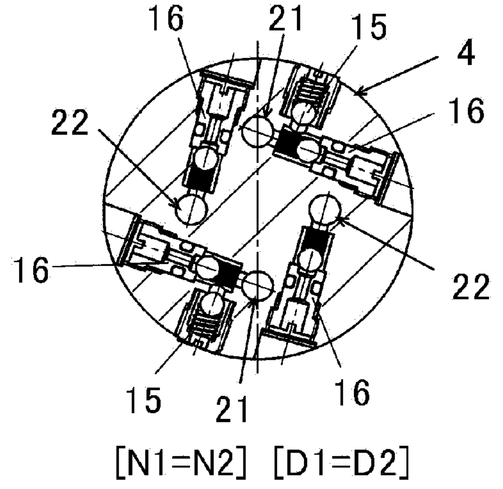
FIG. 2B is a schematic sectional view taken along line B-B in FIG. 2A.
Figure 2C:
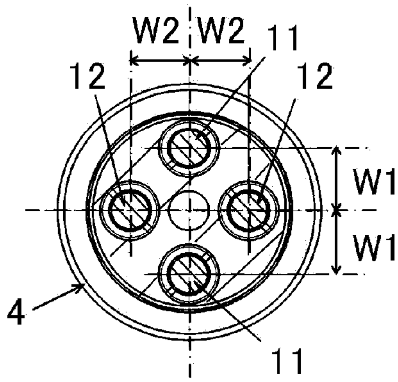
FIG. 2C is a schematic view when
Figure 3A:
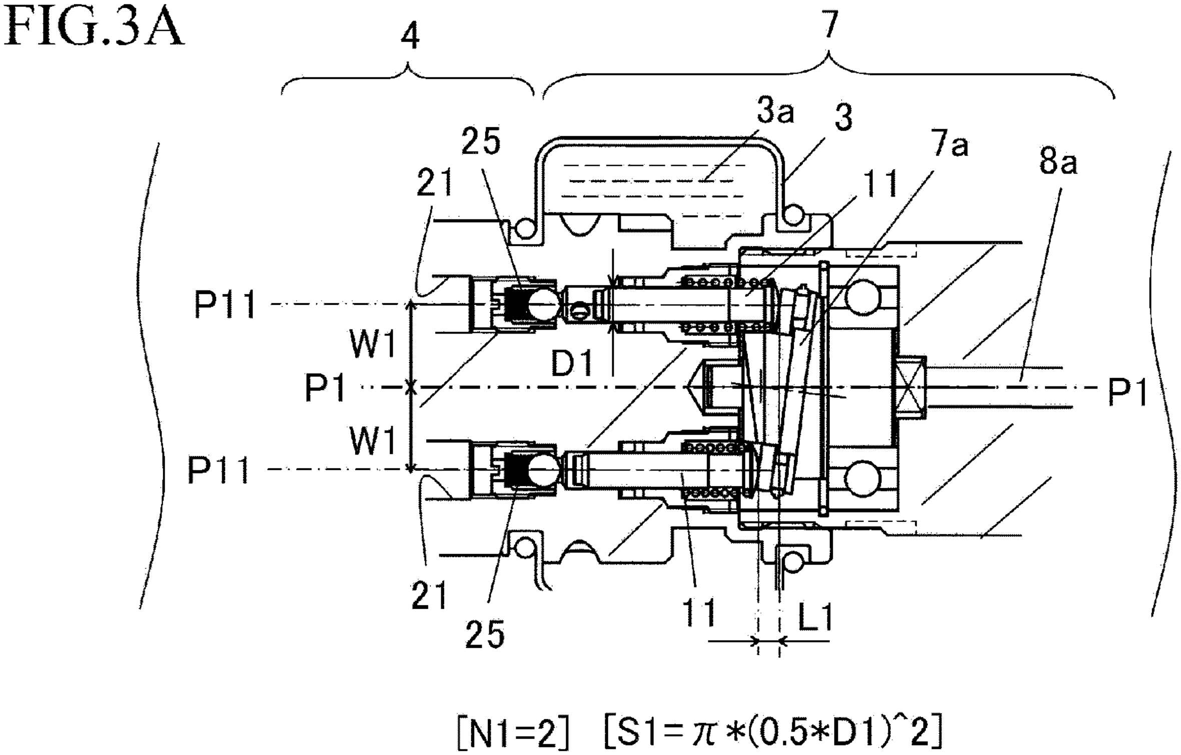
FIG. 3A is a schematic sectional view illustrating a disposition example of a first plunger in the first example of the electric tool illustrated in FIG. 1.
Figure 3B:
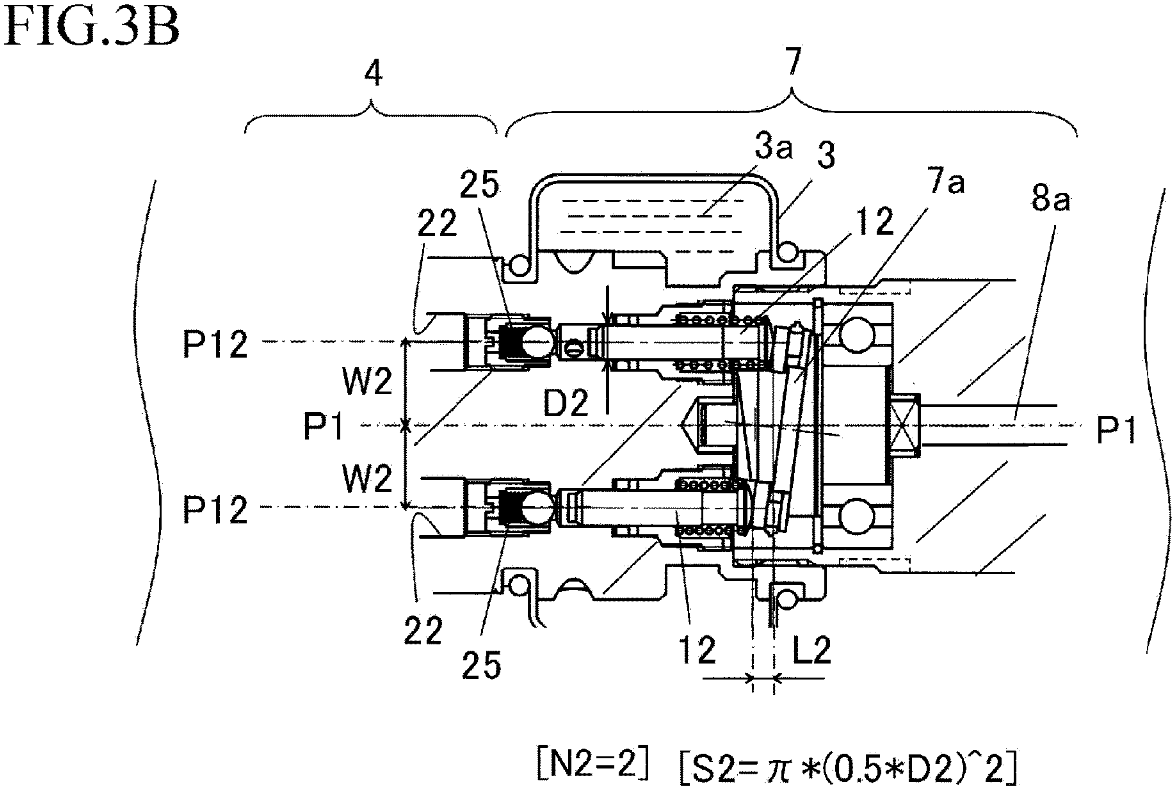
FIG. 3B is a schematic sectional view illustrating a disposition example of a second plunger in the first example of the electric tool illustrated in FIG. 1.
Figure 4:
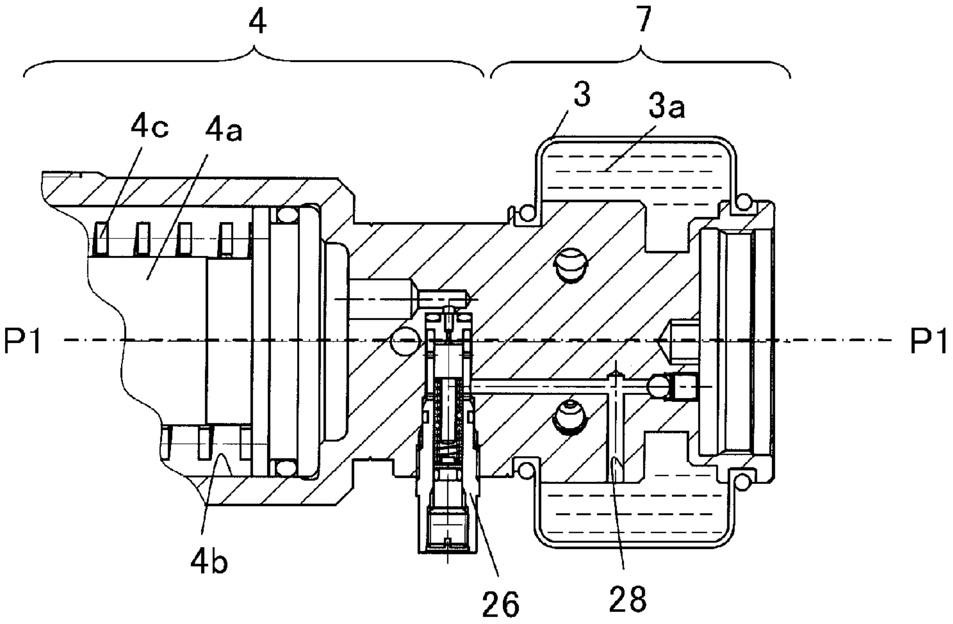
FIG. 4 is a schematic sectional view illustrating the first example of the electric tool illustrated in FIG. 1.

FIG. 2A is a schematic sectional view illustrating a structure of the hydraulic pump 7 in the electric tool 1, FIG. 2B is a schematic sectional view taken along line B-B in FIG. 2A, and FIG. 2C is a schematic view when FIG. 2A is viewed in a C-direction. In addition, FIG. 3A is a schematic sectional view illustrating a disposition example of a first plunger 11 in the hydraulic pump 7 of the electric tool 1, and FIG. 3B is a schematic sectional view illustrating a disposition example of a second plunger 12 in the hydraulic pump 7 of the electric tool 1. FIG. 4 is a schematic sectional view when the electric tool 1 is viewed in a direction different from the above described direction. The electric tool 1 of the present embodiment has a swash plate cam 7*a* coupled to the drive shaft 8*a* of the electric motor 8 and rotated by a driving force of the electric motor 8, and the first plunger 11 and the second plunger 12 which reciprocate while being in contact with the swash plate cam 7*a* disposed around the axis P1 passing through the drive shaft 8*a* in the cylinder part 4.

The oil tank 3 is disposed at a position connecting the cylinder part 4 and the hydraulic pump 7. The oil tank 3 communicates with the hydraulic pump 7 via a check valve 15. In addition, the oil tank 3 communicates with the cylinder part 4 via a relief valve 26.

As illustrated in FIG. 3A, a non-return valve 25 for preventing a backflow of the hydraulic oil 3*a* from the first plunger 11 to the oil tank 3 is disposed at a position on a secondary side of the first plunger 11 which communicates with the piston chamber 4*b*. In addition, the check valve 15 which is brought into an open state at a first pressure serving as a specified pressure or higher, and a non-return valve 16 for preventing a backflow of the hydraulic oil 3*a* to the first plunger 11 are disposed at a position (position on a cross section taken along line B-B) closer to the hydraulic pump 7 than a position where the non-return valve 25 is disposed on the secondary side of the first plunger 11.

As illustrated in FIG. 3B, the non-return valve 25 for preventing the backflow of the hydraulic oil 3*a* to the second plunger 12 is disposed at a position communicating with the piston chamber 4*b* on the secondary side of the second plunger 12. In addition, the non-return valve 16 for preventing the backflow of the hydraulic oil 3*a* from the second plunger 12 to the oil tank 3 is disposed at a position (position on the cross section taken along line B-B) closer to the hydraulic pump 7 than a position where the non-return valve 25 is disposed on the secondary side of the second plunger 12. The check valve 15 is not disposed on the secondary side of the second plunger 12.

As illustrated in FIGS. 3A and 3B, a first flow channel 21 for feeding the hydraulic oil 3*a* by causing the first plunger 11 to reciprocate and a second flow channel 22 for feeding the hydraulic oil 3*a* by causing the second plunger 12 to reciprocate are formed inside the cylinder part 4. In a first example, the first plunger 11 reciprocates along a first center line P11 parallel to the axis P1 passing through the drive shaft 8*a*, and the second plunger 12 reciprocates along a second center line P12 parallel to the axis P1 passing through the drive shaft 8*a*. In addition, as illustrated in FIG. 4, the cylinder part 4 is provided with the relief valve 26 for releasing a pressure inside the piston chamber 4*b* by releasing the hydraulic oil 3*a* in a high-pressure stage. For example, the relief valve 26 is a direct acting relief valve. A return flow channel 28 for returning the hydraulic oil 3*a* to the oil tank 3 through the relief valve 26 is formed inside the cylinder part 4.

The first plunger 11 feeds the hydraulic oil 3*a* to the cylinder part 4 until the pressure reaches the first pressure lower than the second pressure. However, the check valve 15 is opened at the first pressure or higher, and the hydraulic oil 3*a* is not fed to the cylinder part 4. That is, when the pressure reaches the first pressure or higher, the hydraulic oil 3*a* returns from the first plunger 11 to the oil tank 3 through the check valve 15. The second plunger 12 feeds the hydraulic oil 3*a* to the cylinder part 4 in both stages until the pressure reaches the first pressure and until the pressure reaches the second pressure.

As an example, the tool head 9 performs a gripping operation, a temporary gripping operation, or a gripping preparation operation in a low-pressure stage leading to the first pressure, and performs a pressing operation or a crimping operation in a high-pressure stage leading to the second pressure. When a predetermined operation is completed by the tool head 9, the hydraulic oil 3*a* returns to the oil tank 3 from the cylinder part 4 through the relief valve 26. In some cases, the electric tool 1 may have an automatic return function. In a configuration having the automatic return function, when a predetermined operation is completed by the tool head 9, the tool head 9 returns to a state before the operation.

The first example will be described below with reference to FIGS. 3A and 3B.

In the first example, an interval W1 from the axis P1 to the first plunger 11 is set to be larger than an interval W2 from the axis P1 to the second plunger 12. In this manner, the plunger stroke L1 of the first plunger 11 is increased than the plunger stroke L2 of the second plunger 12. Here, the plunger cross-section area S1 in the first plunger 11 and the plunger cross-section area S2 in the second plunger 12 are the same. In addition, the number of plungers N1 in the first plunger 11 is two, and the number of plungers N2 in the second plunger 12 is two. Therefore, the liquid feeding amount per one rotation of the swash plate cam 7*a* in the low-pressure stage leading to the first pressure is configured so that the first liquid feeding amount of the first plunger 11 is increased than the second liquid feeding amount of the second plunger 12.

According to this configuration, a time for transition to the high-pressure stage can be shortened by increasing the liquid feeding amounts of the first plunger 11 and the second plunger 12 in the low-pressure stage until the pressure reaches the first pressure. The maximum current value of the battery 6 can be reduced by reducing the load on the electric motor 8 in the high-pressure stage. That is, an operation time can be shortened by quickly increasing the hydraulic pressure from the low pressure to the high pressure. In addition, a rational operation enables the battery 6 to last a long time. As an example, in a configuration using a battery 6 whose output current is within a range of 1 to 40 [A], it is possible to easily adopt a configuration in which an increase in a battery temperature is reduced by reducing consumption of the battery 6. The above described numerical value is an example, and the present invention is not limited to the above described numerical value.

The first plunger 11 and the second plunger 12 are disposed with a shifted phase at a predetermined interval around the axis P1. In an example in FIG. 2C, the first plunger 11 and the second plunger 12 are respectively disposed in pairs, and are alternately disposed with a shifted phase by every 90 degrees around the axis P1. According to this configuration, a pressure can be linearly increased in accordance with a rotation speed of the swash plate cam 7*a*. Therefore, an operation of the tool head 9 can be easily controlled by the control circuit 27.

The axis P1 coincides with a centerline of the piston 4*a* in a reciprocating direction. As an example, the interval W1 from the axis P1 to the first center line P11 of the first plunger 11 in the reciprocating direction is set to be equal to or greater than 1.04 times and equal to or smaller than 1.12 times the interval W2 from the axis P1 to the second center line P12 of the second plunger 12 in the reciprocating direction. In addition, the plunger stroke L1 in the first plunger 11 is set to be equal to or greater than 1.04 times and equal to or smaller than 1.12 times the plunger stroke L2 in the second plunger 12. The above described numerical value is an example, and the present invention is not limited to the above described numerical value. In any configuration, the configuration is set to fall within ranges of an effective diameter and an effective angle of the swash plate cam 7*a*.

Figure 5A:
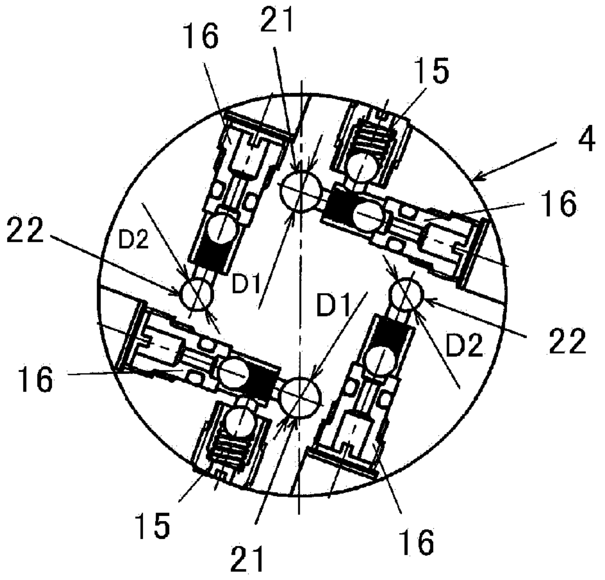
FIG. 5A is a schematic sectional view illustrating a second example of the electric tool illustrated in FIG. 1.

Subsequently, a second example will be described below with reference to FIG. 5A.

In the second example, the plunger cross-section area S1 in the first plunger 11 is increased than the plunger cross-section area S2 in the second plunger 12. Here, the plunger stroke L1 in the first plunger 11 and the plunger stroke L2 in the second plunger 12 are the same. In addition, the number of plungers N1 in the first plunger 11 is two, and the number of plungers N2 in the second plunger 12 is two. Therefore, the liquid feeding amount per one rotation of the swash plate cam 7*a* in the low-pressure stage leading to the first pressure is configured so that the first liquid feeding amount of the first plunger 11 is increased than the second liquid feeding amount of the second plunger 12. Here, FIG. 5A is a schematic sectional view illustrating the second example of the electric tool illustrated in FIG. 1, and corresponds to FIG. 2B in the first example.

According to this configuration, it is possible to easily increase the liquid feeding amount in the low-pressure stage leading to the first pressure. As an example, a diameter of the plunger is 4 to 10 [mm], and the diameter of the plunger is preferably 4 to 6 [mm]. As an example, the plunger cross-section area S1 is set to be equal to or greater than 1.2 times and equal to or smaller than 6.6 times the plunger cross-section area S2. The above described numerical value is an example, and the present invention is not limited to the above described numerical value. In any configuration, the configuration is set to fall within ranges of an effective diameter and an effective angle of the swash plate cam 7*a*.

Figure 5B:
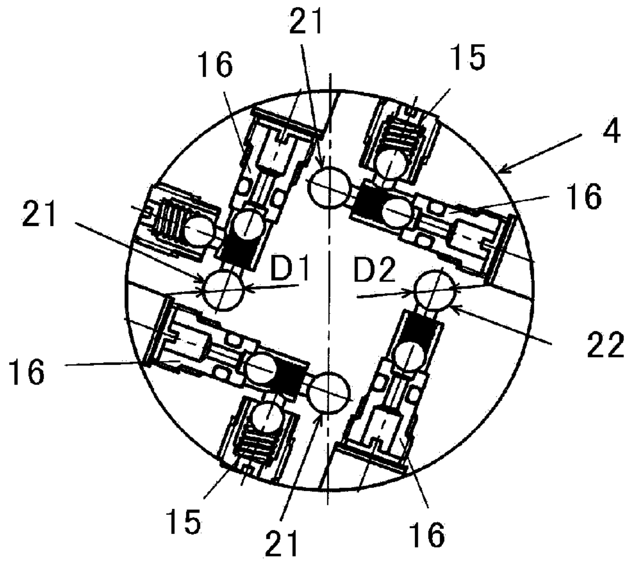
FIG. 5B is a schematic sectional view illustrating a third example of the electric tool illustrated in FIG. 1.

Subsequently, a third example will be described below with reference to FIG. 5B.

In the third example, the number of plungers N1 in the first plunger 11 represents N1=3, and the number of plungers N2 in the second plunger 12 represents N2=1. Here, the plunger stroke L1 in the first plunger 11 and the plunger stroke L2 in the second plunger 12 are the same. In addition, the plunger cross-section area S1 in the first plunger 11 and the plunger cross-section area S2 in the second plunger 12 are the same. Therefore, the liquid feeding amount per one rotation of the swash plate cam 7*a* in the low-pressure stage leading to the first pressure is configured so that the first liquid feeding amount of the first plunger 11 is increased than the second liquid feeding amount of the second plunger 12. Here, FIG. 5B is a schematic sectional view illustrating the third example of the electric tool illustrated in FIG. 1, and corresponds to FIG. 2B in the first example.

According to this configuration, it is possible to easily increase the liquid feeding amount in the low-pressure stage leading to the first pressure. As an example, the number of plungers N1 represents N1=3, and the number of plungers N2 represents N2=2. As an example, the number of plungers N1 represents N1=3, and the number of plungers N2 represents N2=1. As an example, the number of plungers N1 represents N1=2, and the number of plungers N2 represents N2=1. These combinations are examples, and the present invention is not limited to the combinations. In any configuration, the configuration is set to fall within ranges of an effective diameter and an effective angle of the swash plate cam 7*a*.

In the above described example, as the first plunger 11 and the second plunger 12, four in total are disposed with a shifted phase at a predetermined interval around the axis P1. However, the present invention is not limited to this example. For example, it is possible to adopt a configuration in which as the first plungers 11 and the second plungers 12, two in total are disposed. In addition, for example, it is possible to adopt a configuration in which the first plunger, the second plunger, and a third plunger are respectively disposed with a shifted phase at a predetermined interval around the axis P1.

The present invention is not limited to the embodiment described above, and various modifications can be made within the scope not departing from the present invention.

What is claimed is:

1. An electric tool comprising:

a main body in which a cylinder part, an oil tank, a hydraulic pump for feeding hydraulic oil inside the oil tank to the cylinder part, and an electric motor for driving the hydraulic pump are disposed;

a tool head operated by a pressing force of a piston in the cylinder part in a state of being coupled to the main body; and a battery that supplies electric power to the electric motor, wherein the hydraulic pump has a swash plate cam rotated while being coupled to a drive shaft of the electric motor, and a plurality of plungers disposed around an axis passing through the drive shaft in the cylinder part and reciprocating while being in contact with the swash plate cam, a first plunger of the plungers is provided with a check valve that opens at a first pressure on a secondary side, a second plunger of the plungers is not provided with the check valve on the secondary side, a relief valve that opens at a second pressure higher than the first pressure is disposed in the cylinder part, and until the pressure reaches the first pressure, a first liquid feeding amount of the first plunger is increased more than a second liquid feeding amount of the second plunger.

2. The electric tool according to claim 1, wherein a product of a plunger stroke L1, a plunger cross-section area S1, and the number of plungers N1 in the first plunger is larger than a product of a plunger stroke L2, a plunger cross-section area S2, and the number of plungers N2 in the second plunger.

3. The electric tool according to claim 2, wherein the oil tank communicates with the hydraulic pump via the check valve, and the oil tank communicates with the cylinder part via the relief valve.

4. The electric tool according to claim 1, wherein the oil tank communicates with the hydraulic pump via the check valve, and the oil tank communicates with the cylinder part via the relief valve.

* * * * *